(12) United States Patent
Chan

(10) Patent No.: US 6,757,226 B2
(45) Date of Patent: Jun. 29, 2004

(54) METHOD FOR REDUCING THE TURN-BACK OF THE TRACK-SEEKING CONTROL IN AN OPTICAL STORAGE DEVICE AND APPARATUS THEREOF

(75) Inventor: Yi-Chung Chan, Taipei (TW)

(73) Assignee: Via Technologies, Inc., Taipei (TW)

( * ) Notice: Subject to any disclaimer, the term of this patent is extended or adjusted under 35 U.S.C. 154(b) by 463 days.

(21) Appl. No.: 09/769,331

(22) Filed: Jan. 26, 2001

(65) Prior Publication Data

US 2001/0010669 A1 Aug. 2, 2001

(30) Foreign Application Priority Data

Feb. 1, 2000 (TW) .......................................... 89101716 A

(51) Int. Cl.$^7$ ................................................ G11B 7/00
(52) U.S. Cl. .............................. 369/44.28; 369/30.13; 369/53.29
(58) Field of Search ........................... 369/30.1, 44.18, 369/44.28, 53.14, 53.18, 53.28, 53.29, 232, 234, 30.03–30.17

(56) References Cited

U.S. PATENT DOCUMENTS

| | | | | |
|---|---|---|---|---|
| 4,835,752 A | * | 5/1989 | Nakatsu et al. | 369/30.17 |
| 4,855,977 A | * | 8/1989 | Getreuer et al. | 369/44.28 |
| 5,398,221 A | * | 3/1995 | Ogawa | 369/44.28 |
| 5,428,590 A | * | 6/1995 | Ogino | 369/44.28 |
| 5,475,663 A | * | 12/1995 | Ogino | 369/44.28 |
| 5,477,513 A | * | 12/1995 | Onodera et al. | 369/44.28 |
| 5,487,055 A | * | 1/1996 | Suzuki | 369/30.17 |
| 5,682,362 A | * | 10/1997 | Suzuki et al. | 369/30.15 |
| 5,802,019 A | * | 9/1998 | Yamada | 369/30.17 |
| 6,256,275 B1 | * | 7/2001 | Eguchi et al. | 369/44.28 |

* cited by examiner

*Primary Examiner*—Doris H. To
*Assistant Examiner*—Jorge Ortiz Criado
(74) *Attorney, Agent, or Firm*—Rabin & Berdo, P.C.

(57) ABSTRACT

A method for reducing the turn-back in response to an actual and a target speed in an optical storage device. The method includes the following steps: (a) determining whether the turn-back of the optical pickup head occurs; if the turn-back occurs, step (b) is executed and if the turn-back does not occur, a speed error is obtained according to the target speed and the actual speed; (b) determining whether the number of turn-back tracks is greater than a default value; if the number of turn-back tracks is not greater than the default value, the speed error is set to zero and if the number of turn-back tracks is greater than the default value, the speed error is obtained according to the target speed and an inversion of the actual speed and the actual track-seeking direction is inverted to correspond to the target track-seeking direction.

14 Claims, 7 Drawing Sheets

METHOD FOR REDUCING THE TURN-BACK OF THE TRACK-SEEKING CONTROL IN AN OPTICAL STORAGE DEVICE AND APPARATUS THEREOF

This application incorporates by reference Taiwanese application Serial No. 89101716, filed Feb. 1st, 2000.

BACKGROUND OF THE INVENTION

1. Field of the Invention

The invention relates in general to a method for reducing the turn-back of the track-seeking control in an optical storage device and an apparatus thereof.

2. Description of the Related Art

FIG. 1 is a block diagram illustrating the structure of an optical storage device. The optical storage device indicated here includes at least a CD-ROM drive and a Digital Versatile Disk (DVD) drive.

Referring to FIG. 1, a spindle motor 100 is used to drive an optical disk 101 to the required rotation speed. A sled motor 102 is used to drive the sled 105 which is equipped with an optical pickup head 104 for rough tracking and seeking operations. The tracking operation is used to drive the optical pickup head 104 to a certain track on the optical disk 101 for reading data.

Fine-tuning operations include focusing and tracking operations. The focusing operation involves the objective lens 120 running in a vertical direction in order to accurately read data on the optical disk 101 whereas the tracking operation involves the objective lens 120 running in a horizontal direction to find the desired track.

When a laser is focused on the optical disk 101, the reflected light is received by the optical sensor on the optical pickup head 104. Optical pickup head 104 outputs the signals corresponding to data stored in the optical disk 101 as well as signals for various servo controls.

The signals outputted from the optical pickup head 104 are transformed by a preamplifier 106 into radio frequency (RF) signals and other signals for various servo controls such as tracking error (TE) signal, RFRP signal, and RFCT signal. These signals are then inputted to the control integrated circuit (control IC) for processing. Included in the control IC 108 are, for example, a digital signal processor (DSP) in addition to other analog or digital circuitry. The control IC 108 obtains an output data by performing the demodulation and error correction of the received RF signals and sends out the output data to the decoder 112 and then the host computer 114 for further processing. Meanwhile, the control IC 108 processes the servo signals with necessary compensations and outputs to power amplifiers 116 and 118 to drive the spindle motor 100, the sled motor 102, the focusing actuator and the tracking actuator.

The microprocessor 122 is responsible for the overall operation of the disk as well as the user interfaces such as controlling the opening of the disk tray.

Next, signals obtained by the optical pickup head 104 is inputted to the preamplifier 106 which outputs the RF signal, and other signals for various servo controls, for example, the TE signal, the RFRP signal, and the RFCT signal. Then, these signals are processed by the control IC 108 such as a digital signal processor, DSP, or other digital or analog circuits. The control IC 108 processes the RF signal with error correction and outputs data to the decoder 112. Then, the output of the decoder 112 is inputted to the main computer 114 for further processing. On the other hand, the control IC 108 outputs the servo signals to the power amplifiers 116 and 118 for driving the spindle motor 100, the sled motor 102, the focusing actuator and the tracking actuator of the objective lens 120 in the optical pickup head 104.

Moreover, the microprocessor 122 controls the whole process and the user interface of the optical storage device, for example, the opening the tray of the optical storage device.

Referring to FIG. 2, the flow chart of the track-seeking control is illustrated. Before the track-seeking control starts, in step 200, the target is set up. The target is a position of an optical disk for reading data. For a CD-ROM, the target is a data block number, and, for a DVD-ROM, the target is a data sector number.

In step 202, the current position is read. In step 204, whether the current position is the target is determined. If the current position is the target, the track-seeking control is ended. On the other hand, if the current position is not the target, in step 206, the direction and the number of tracks needed for the track-seeking control is calculated from the difference between the target and the current positions.

Next, step 208 is executed whereby the tracking operation ends and the track-seeking control starts. Then, in step 210, whether the number of traversed tracks is equal to the number of tracks needed for the track-seeking control is determined. If not, step 208 is repeated. If yes, in step 212, the track-seeking control is ended and the tracking operation is started and step 202 is repeated.

Generally, there is a phenomenon called eccentricity for the optical disk 101. The eccentricity is formed due to the fact that the center of the optical disk 101's circular hole is not located exactly in the center. Moreover, sometimes, when the optical disk 101 is spinning, there are vertical and horizontal vibrations. As a result, when the optical pickup head 104 is in seeking control, the turn-back occurs under some circumstances. For example, because of the serious eccentricity of optical disk 101 or noises when in low-speed track-seeking control or actuator's inertia when the sled motor is speeding up or slowing down, the turn-back of the optical pickup head occurs.

FIG. 3 is a block diagram illustrating the track-seeking control of the optical storage device. The RF signals reflected from the optical disk 101 are received by an optical pickup head 300, and amplified by the preamplifier 302. After the procession of the track-seeking processor 304 and the frequency compensation of the compensators 306 and 308, the RF signals are inputted to power amplifiers 310 and 312 for fine tuning of the objective lens actuator 314 and rough tuning of the sled motor 316, respectively. Then, the whole process is repeated until the target track is found, that is, the purpose of the track-seeking control is achieved.

Here, the track-seeking processor 304 and compensators 306 and 308 are in the control IC 108 shown in FIG. 1. The track-seeking processor 304 is used to reduce the turn-back of the track-seeking control of the optical storage device according to the invention.

Referring to FIG. 4, a diagram of the target speed and the actual speed of the track-seeking control is illustrated. In FIG. 4, the unbroken line 40 represents the target speed and the dotted line 42 represented actual speed. Considering the target speed first, it is assumed that the pickup head is to jump over 200 tracks. Speed of track-seeking control is kept at 20 kHz at the beginning. Then, when residual track number is 100, speed of track-seeking control slows down. The reasons that the target speed is set in this way are illustrated below. Because there are many tracks for seeking at the beginning, the target speed can be set in a higher speed. Then, when the target track is approached, the speed of track-seeking needs to slow down for preventing that the target track cannot be locked correctly because of inertia of the pickup head.

The actual speed of the pickup head starts from zero and responsive to the target speed until the target track is approached.

The difference between the target speed and the actual speed is called speed error. The speed error feeds back to the track-seeking processor 304 for controlling the spinning speed of the optical disk 101. When the actual speed is smaller than the target speed, the speed error is positive. Then, when the speed error is fed back to the compensator, the actual speed is increased. On the other hand, when the actual speed is greater than the target speed, the speed error is negative. Then, when the speed error is fed back to the compensator, the actual speed is decreased.

Referring to FIG. 5 and FIG. 6, FIG. 5 is a block diagram illustrating the track-seeking processor 304 shown in FIG. 3 and FIG. 6 is a timing diagram of some relative signals. A radio frequency zero crossing (RFZC) signal and a tracking error zero crossing signal (TEZC) signal, which are outputted from the preamplifier 302, are inputted to the track-seeking processor 304 for further processing.

The RFZC signal is derived from a RFRP signal and a slice level of the RFRP signal. For example, the zero amplitude level of the RFRP signal is taken as the slice level. When the RFRP signal is greater than the slice level, the RFZC signal is in the high level. On the other hand, when value of the RFRP signal is smaller than the slice level, the RFZC signal is in the low level.

The RFRP signal is derived from a RF signal. When the pickup head is focused on a track, the RF signal is the greatest. When the pickup head is focused between two tracks, the RF signal is the lowest. The RFRP signal is derived by difference between the lower envelope of the RF signal and the upper envelope of the RF signal, or by low-pass filtering of the RF signal.

Similarly, the TEZC signal is derived from a TE signal and a slice level of the TE signal. For example, the zero amplitude level of the TE signal is taken as the slice level. When the TE signal is greater than the slice level, the TEZC signal is in the high level. On the other hand, when the TE signal is smaller than the slice level, the TEZC signal is in the low level.

The TE signal is used as an indication for track-locking or not. For example, on time T2, the TE signal is zero, which means that the objective lens 120 in FIG. 1 is focused on the track. However, when the objective lens 120 is focused between two tracks, the TE signal would be zero, too, such as on time T4. When the objective lens 120 is focused on the edge of a track, the absolute value of TE signal is the greatest, such as on time T1 and T3.

Therefore, one cycle of the TE or the RF signals represents that the optical pickup head is jumped through one track. In the same manner, one cycle of the RFZC signal or the TEZC signal means that the optical pickup head is jumped through one track. As a result, the actual speed of the optical pickup head can be derived from the RFZC signal and the TEZC signal, which is the function of the actual speed detector 500.

Moreover, the relation between the RFZC and TEZC signal is illustrated below. When the optical pickup head moves inward relative to the optical disk, such as after time T5, the TEZC signal leads before the RFZC signal by 90 degrees. On the other hand, when the optical pickup head moves outward relative to the optical disk, the RFZC signal would lead before the TEZC signal by 90 degrees, such as before time T5. Due to this characteristic, by comparing the phase difference between these two signals, the track-seeking direction of the optical pickup head can be found out, which is the function of the direction detector 502.

In the timing diagram illustrating the track-seeking direction shown in FIG. 6, the high level means that the track-seeking direction is outward while the low level represents that the track-seeking direction is inward. Moreover, the track-seeking direction changes on time T6 rather than time T5 because the track-seeking direction detected by the direction detector 502 is derived by detecting the phase change between the RFZC signal and the TEZC signal. This is why track-seeking direction is changed on time T6.

The track number counter 504 derives the number of tracks jumped by the optical pickup head from the TEZC and RFZC signal. Then, the number of tracks derived is inputted into the target speed generator 506 to obtain the target speed needed. The target speed generator 506 derives the target speed from the target speed curve shown in FIG. 4 by referencing the number of tracks obtained by the track number counter 504.

The speed error generator 508 receives data from the actual speed detector 500, direction detector 502, and target speed generator 506 and generates a speed error signal, which is inputted into the compensator 306, for example.

As mentioned above, when the optical pickup head is in the track-seeking control, the turn-back occurs under some certain conditions. When the turn-back occurs, it means that the track-seeking direction is wrong. If this turn-back cannot be reduced in time, it results in inaccurate number of tracks sought, increase of data access time, etc.

Moreover, if the track-seeking method does not consider the turn-back, it can result in error in the track-seeking control. Generally speaking, when turn-back is not considered, the speed error is obtained by subtracting the actual speed from the target speed. Once the turn-back occurs, if the speed error is positively fed back to the compensator, the divergence of the track-seeking control occurs.

For example, if the desired track-seeking direction is outward, the target speed is 5 kHz, actual speed is 6 kHz, and the actual track-seeking direction is outward, the speed error is 5 kHz−6 kHz=−1 kHz. As a result, the compensator drives the actuator of the optical pickup head to move inward, which results in a reduction of the speed of the optical pickup head to approach the target speed.

On the other hand, if the turn-back occurs, it means that the desired track-seeking direction is outward but the actual track-seeking direction is inward. For example, when the actual speed is 6 kHz, the speed error is still −1 kHz. Therefore, the compensator drives the actuator of the optical pickup head inward to reduce the speed of the optical pickup head. However, since the turn-back occurs, the actual track-seeking direction is inward rather than outward. Thus, the inward force generated by the actuator of the optical pickup head makes the optical pickup head far away from the target track, which results in the divergence of the track-seeking control.

Conventionally, when the turn-back is detected, the track-seeking control is forced to cease and begin again. However, this conventional method has the following disadvantages. First, when the track-seeking control is forced to cease, the tracking operation is forced to complete and the current position is informed to obtain the position and the direction needed for the new track-seeking control, which results in an increase of overall access time. Second, due to the inertia of the optical pickup head, sudden cease of the track-seeking control results in the instability of the whole system.

SUMMARY OF THE INVENTION

It is therefore an object of the invention to provide a method for reducing the turn-back of the track-seeking control in an optical storage device. When the turn-back occurs, the direction of the optical pickup head can be effectively corrected to the right direction to proceed with the track-seeking control rather than forcing the track-seeking control to cease and start again in the conventional method. Thus, the stability of the system is increased and the track-seeking time is reduced. Also, the temporary or the erroneously determined turn-back causes by noises can be prevented.

The invention achieves the above-identified objects by providing a method for controlling the turn-back in response to an actual speed and a target speed in an optical storage device. The method includes the following steps: (a) determining whether the turn-back of the optical pickup head occurs; if the turn-back occurs, step (b) is executed and if the turn-back does not occur, a speed error is obtained according to the target speed and the actual speed; (b) determining whether the number of turn-back tracks is greater than a default value; if the number of turn-back tracks is not greater than the default value, the speed error is set to zero and if the number of turn-back tracks is greater than the default value, the speed error is obtained according to the target speed and an inversion of the actual speed.

The invention achieves the above-identified objects by providing a track-seeking processor for reducing the turn-back in an optical storage device having a pickup head in response to a TEZC signal and a RFZC signal. The track-seeking processor includes an actual speed detector, a direction detector, a track number counter, a target speed generator, and a speed error generator. The actual speed detector receives the RFZC signal and the TEZC signal to obtain an actual speed of the optical pickup head of the optical storage device. The direction detector receives the RFZC and TEZC signals to obtain the track-seeking direction of the optical pickup head by a phase difference between the RFZC and TEZC signals. The track number counter receives the TEZC signal or the RFZC signal to obtain the number of tracks jumped by the optical pickup head. The target speed generator is connected to the track number counter and receives the number of tracks generated by the track number counter to obtain a target speed of the optical pickup head. The speed error generator is connected to the actual speed detector, direction detector, track number counter, and target speed generator for generating a speed error. When the turn-back does not occur, the speed error is set according to the target speed and the actual speed. When the turn-back occurs, if the number of turn-back tracks is not greater than a default value, the speed error is set to zero; if the number of turn-back tracks is greater than a default value, the speed error is set according to the target speed and inversion of the actual speed, and the turn-back is controlled by the speed error.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
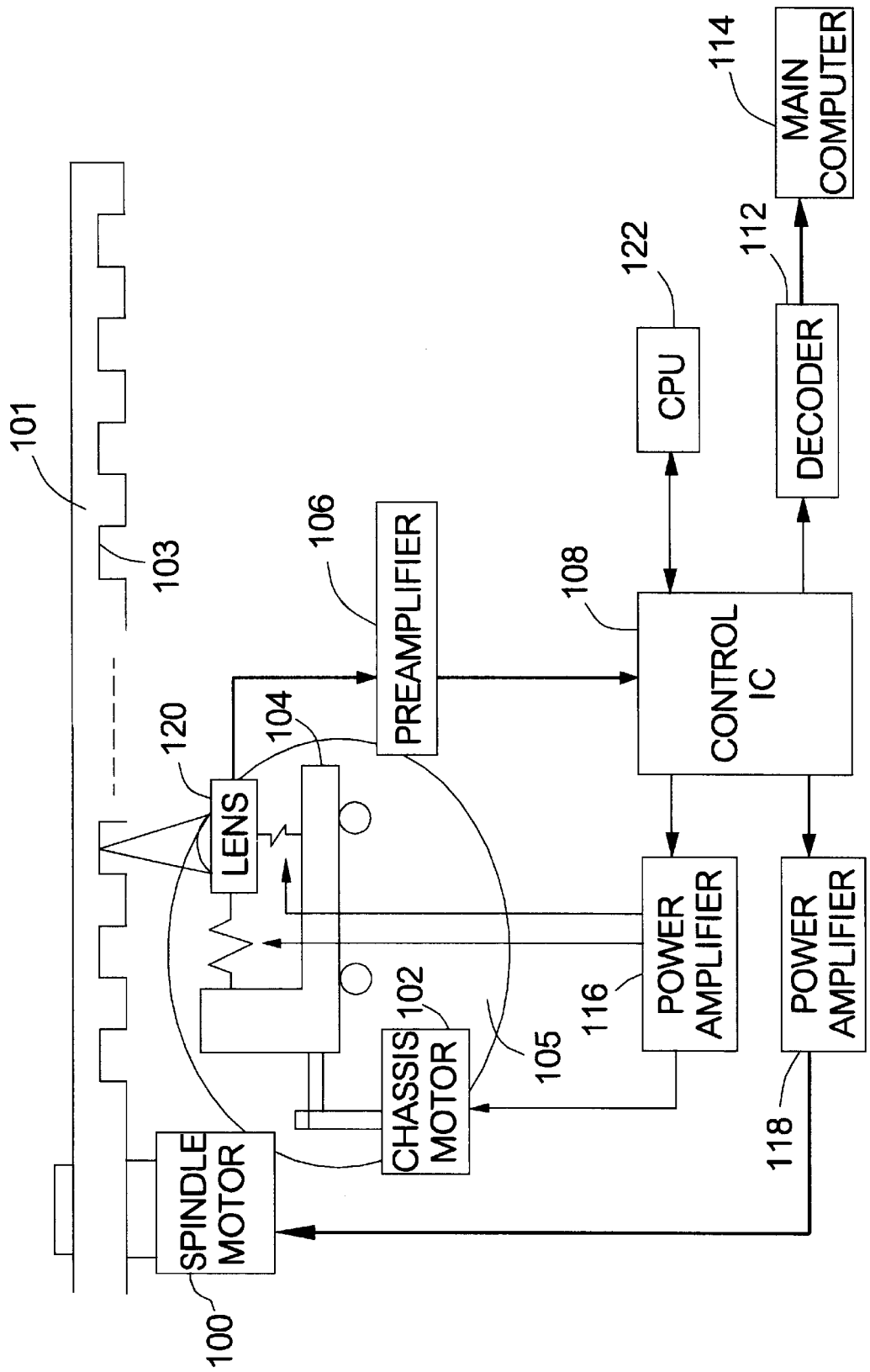
FIG. 1 (Prior Art) is a block diagram illustrating the structure of an optical storage device.
Figure 2:
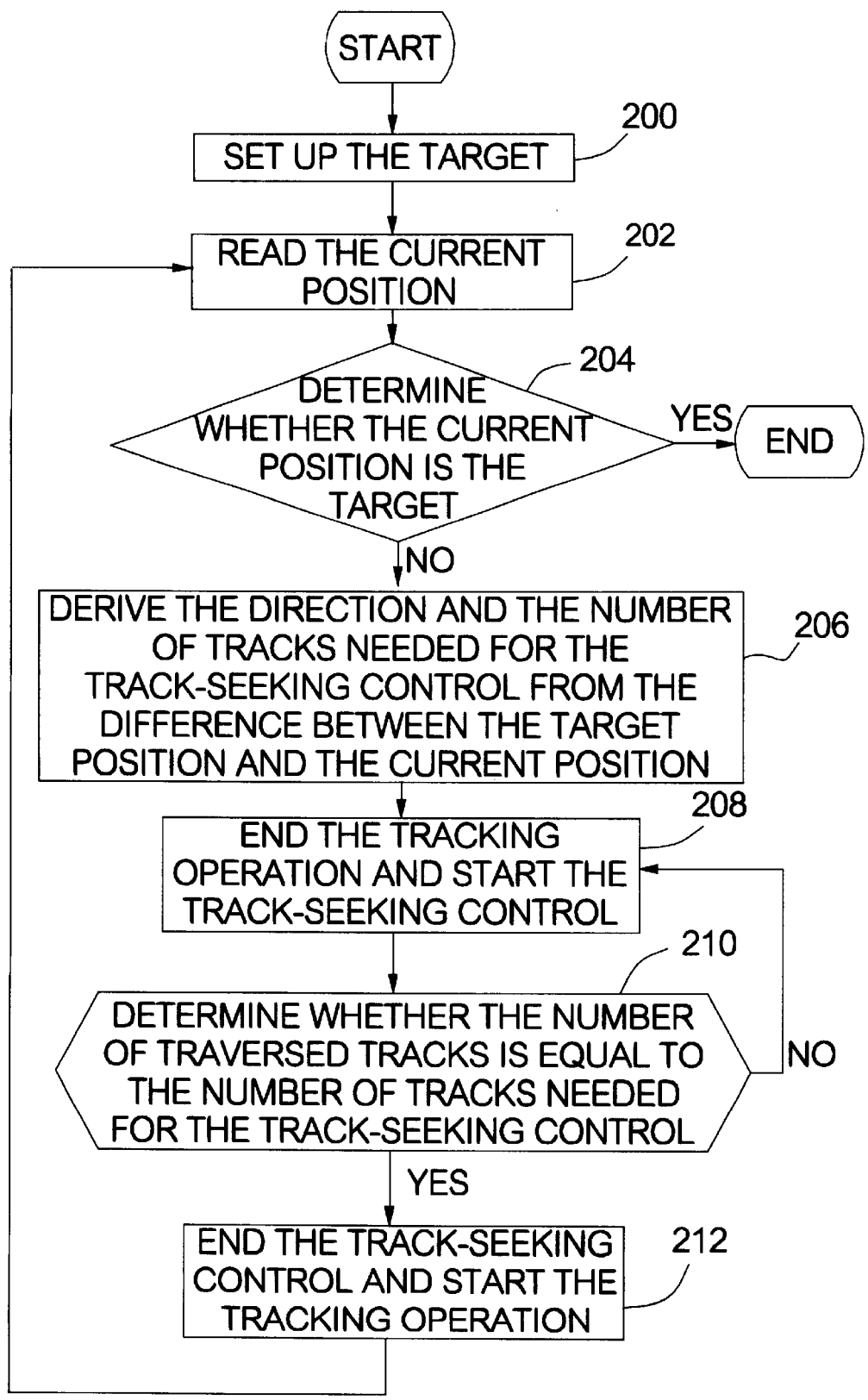
FIG. 2 (Prior Art) shows a flow chart of the track-seeking control.
Figure 3:
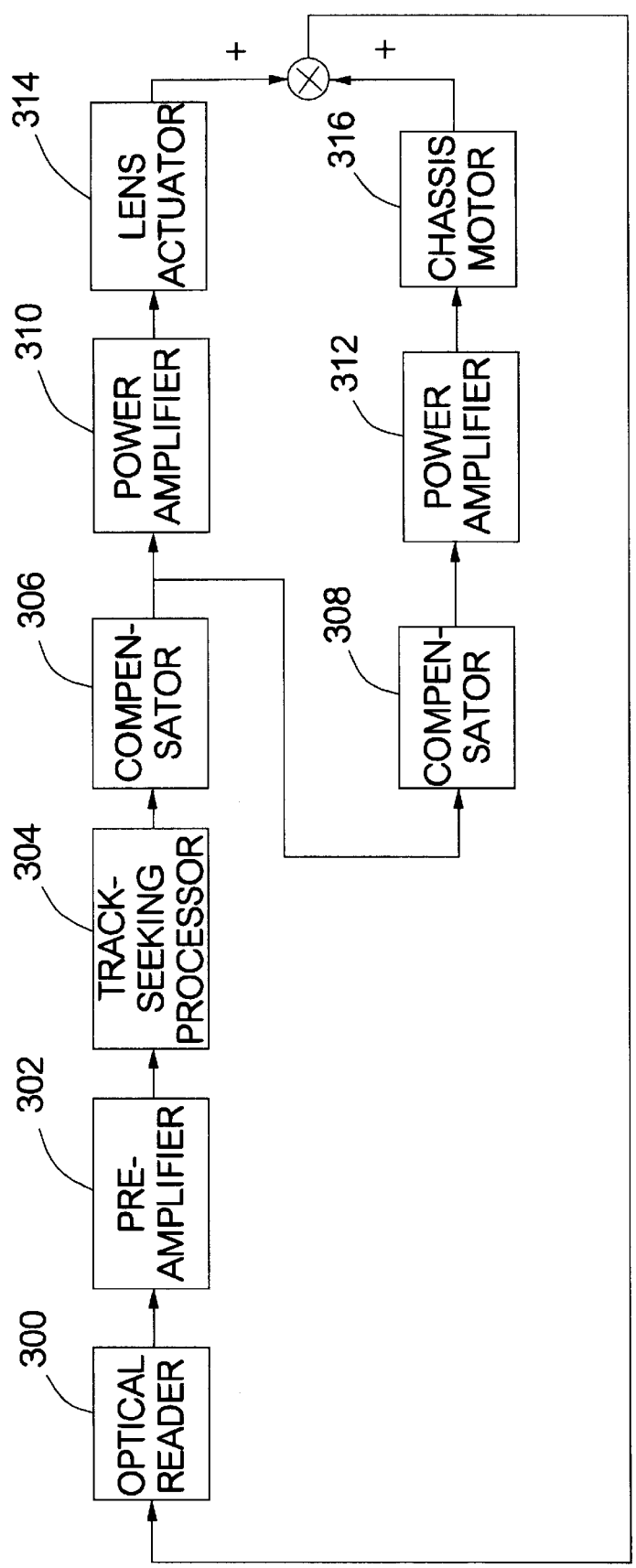
FIG. 3 (Prior Art) is a block diagram illustrating the track-seeking control of the optical storage device.
Figure 4:
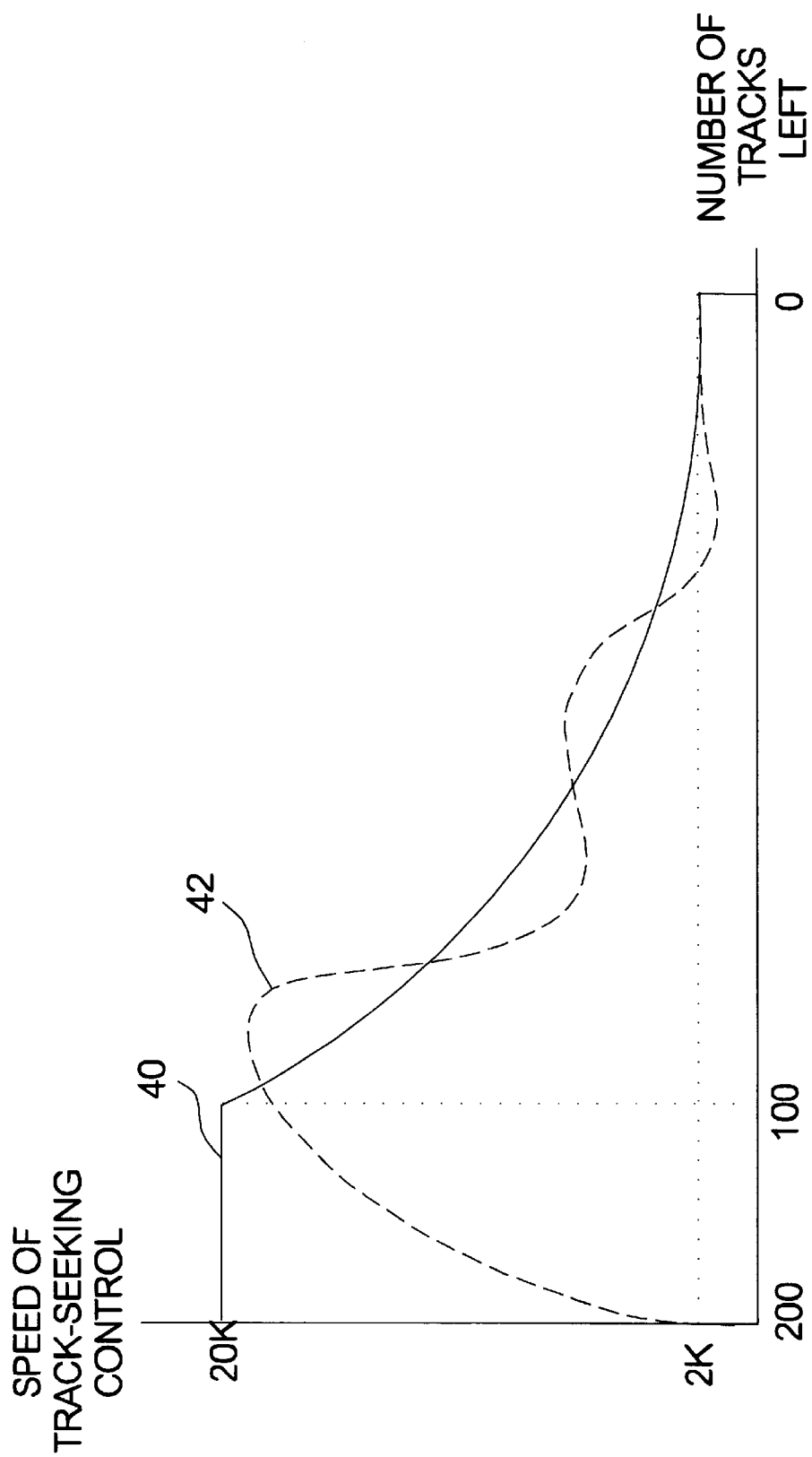
FIG. 4 (Prior Art) shows a timing diagram of the target speed and the actual speed of the track-seeking control.
Figure 5:
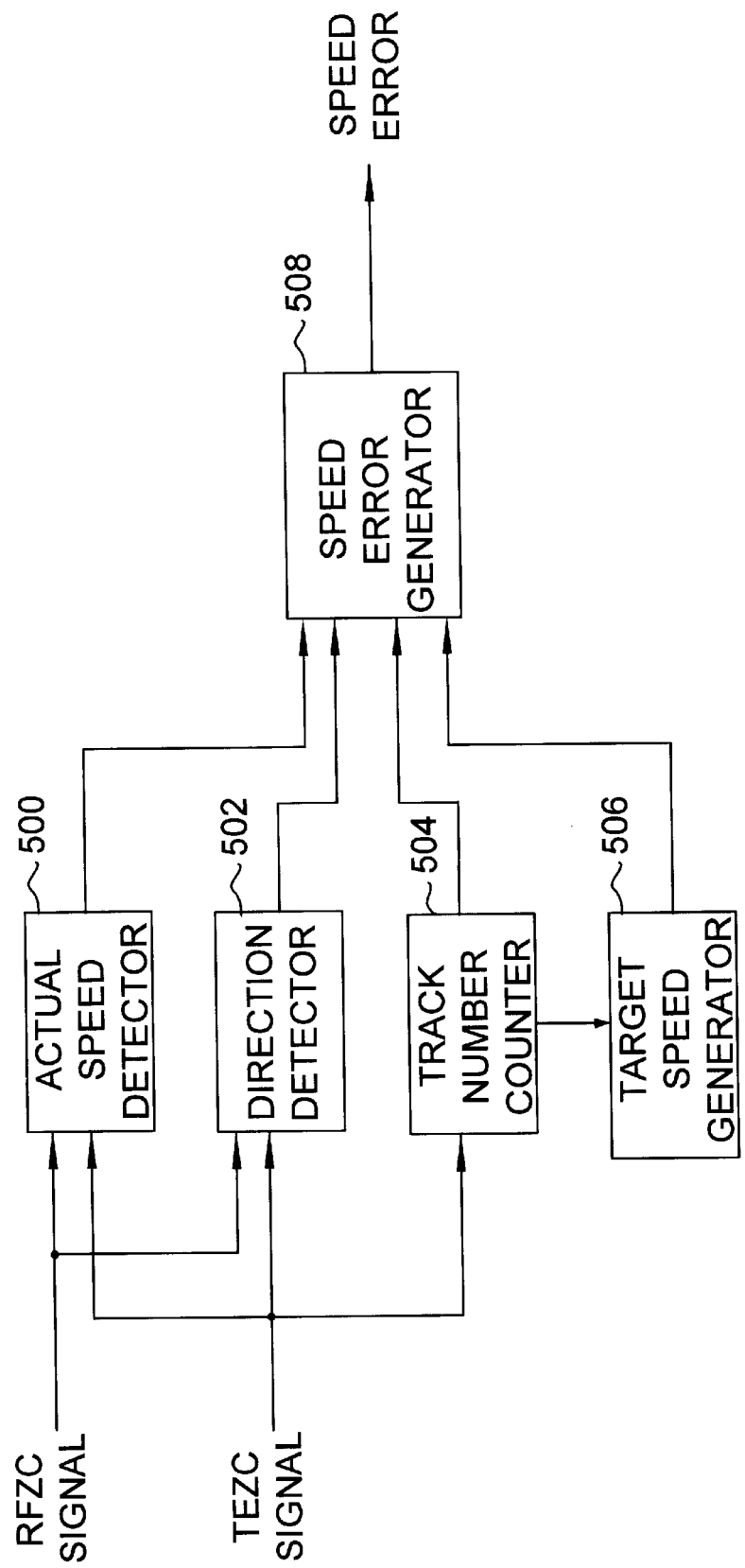
FIG. 5 shows a block diagram of functions of the track-seeking processor.
Figure 6:
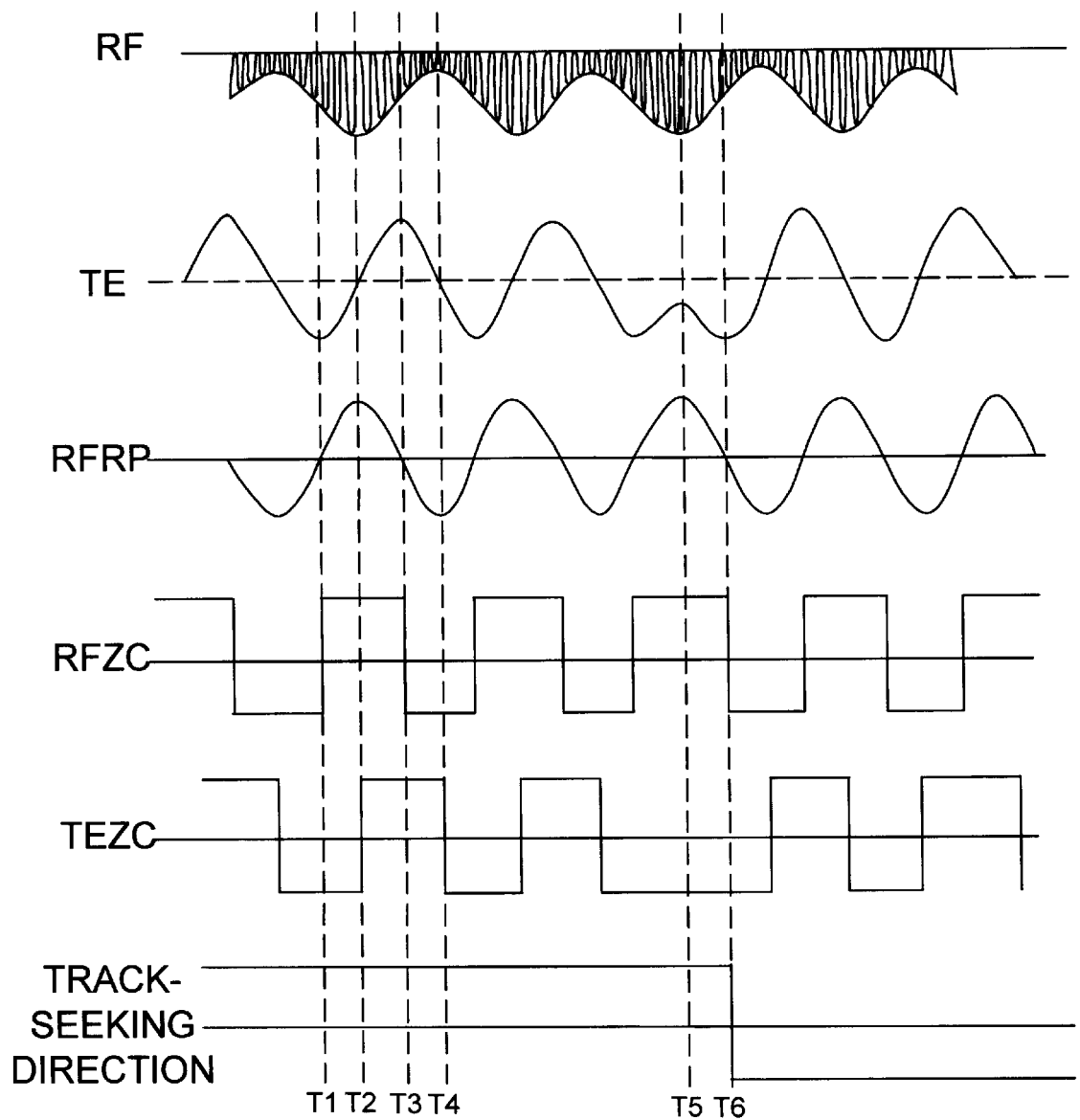
FIG. 6 shows a timing diagram of relative signals in track-seeking.
Figure 7:
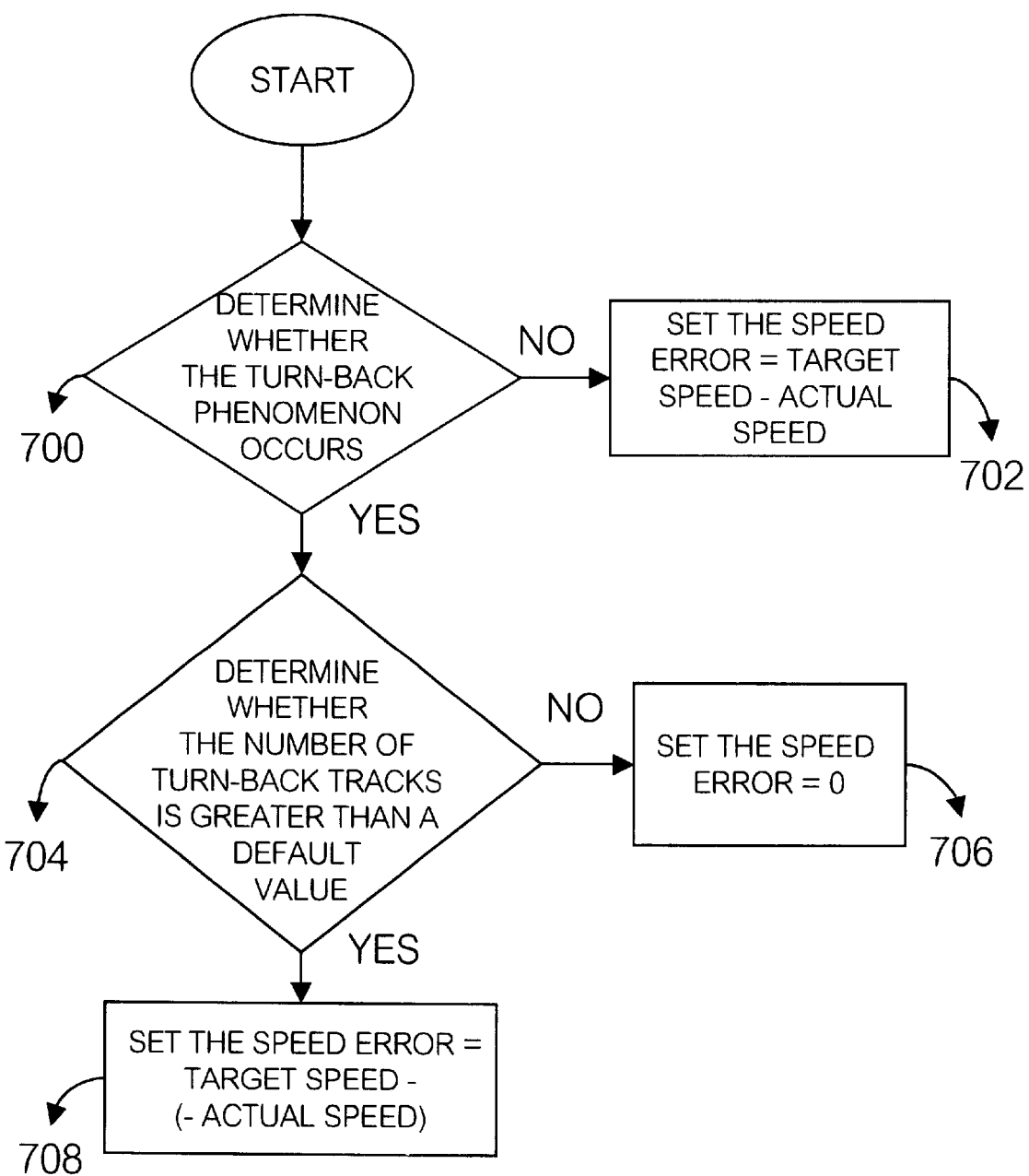
FIG. 7 is a flow chart illustrating the method for reducing the turn-back of the track-seeking control in an optical storage device according to the invention.

Referring to FIG. 7, a flow chart illustrating the method for reducing the turn-back of the track-seeking control in an optical storage device according to the invention. In step 700, whether the turn-back occurs is determined. The turn-back is determined by a direction detector. If the turn-back does not occur, step 702 is executed. In step 702, the speed error is set as target speed minus actual speed, that is, the definition of the speed error is not changed. In step 700, if the turn-back occurs, step 704 is executed, that is, whether the number of turn-back tracks is greater than a default value is determined. The default value can be set as 0, 0.5, 1.5, 2, 2.5, 3, . . . and so on, wherein 0.5 represents a half-track. Moreover, the smaller the default value is, the smaller the hysteresis effect is. That is to say, when turn-back occurs, the force to restrain the turn-back generates faster if the default value is smaller. For example, if the default value is 0, once the turn-back occurs, the force to restrain the turn-back generates instantly. On the other hand, the larger the default value is, the more tolerant of noise the optical storage device has. Thus, the temporary turn-back caused by noise or an accident turn-back caused by glitches of the TEZC signal and the RFZC signal are reduced. However, the response time for the turn-back is delayed.

In step 704, if the number of turn-back tracks is not greater than the default value, step 706 is executed, that is, the speed error is set to 0. Thus, the accident turn-back caused by glitches of the TEZC signal and the RFZC signal is reduced. Here, the low-pass component of the controller makes the optical pickup head moves in similar speed.

On the other hand, if the number of turn-back tracks is larger than the default value, step 708 is executed, that is, speed error=target speed−(−actual speed). This is because when the turn-back occurs, it leads to divergence of the track-seeking control if the original definition of speed error is adopted. The divergence of the track-seeking control means that the optical pickup head moves toward the opposite direction to the target track and cannot reach the target track. That is, the track-seeking control fails.

Therefore, in the method for reducing the turn-back of the track-seeking control in an optical storage device according to the invention, the direction of the actual speed is inverted and then subtracted from the target speed to obtain a newly-defined speed error signal. Thus, when the newly-defined speed error signal is fed back to the compensator, the compensator can generate a force to restrain the turn-back. Also, the magnitude of the force is automatically adjusted according to the state of the turn-back.

It is assumed that the turn-back occurs, the track-seeking direction is outward, the target speed is 5 k, the actual track-seeking direction is inward, and the actual speed is 2 k. When the turn-back occurs in this situation, the speed error is 5 k–(–2 k)=7 k. The compensator generates an outward force in positive proportion to 7 k to correct the turn-back. When the turn-back is more serious, for example, the target speed is 5 k, the actual track-seeking direction is inward, and the actual speed is 6 k, then, the speed error is 5 k–(–6 k)=11 k. As a result, the compensator generates a force proportional to 11 k. In this way, when the turn-back occurs, the direction of the optical pickup head is corrected to the correct direction to continue the track-seeking control rather than being reset. Thus, the stability of the system is increased and the temporary or the erroneously determined turn-back is prevented. Also, the track-seeking time is reduced. The speed error obtained in steps 702, 706, or 708 is received by the compensator to proceed with the following track-seeking control.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for controlling a turn-back in response to an actual speed and a target speed in an optical storage device when track-seeking is proceeding, wherein the occurrence of the turn-back indicates that an actual track-seeking direction, associated with the actual speed, and a target track-seeking direction, associated with the target speed, do not correspond to each other, the method comprising the steps of:

(a) determining whether the turn-back of the optical pickup head occurs, and if not, obtaining a speed error according to the target speed and the actual speed; and
    (b) if turn-back of the optical pickup head is determined to occur in step (a), then determining whether the number of turn-back tracks is greater than a default value which indicates tolerance to the turn-back of the optical storage device;
    (c) if in step (b) the number of turn-back tracks is determined to be greater than a default value setting the speed error according to the target speed and an inversion of the actual speed and inverting the actual track-seeking direction; and
    (d) if in step (b) the number of turn-back tracks is determined to be not greater than the default value setting the speed error as zero;

wherein the actual track-seeking direction corresponds to the target track-seeking direction when the turn-back is controlled in response to the speed error.

2. The method according to claim 1, wherein in the step (a), whether the turn-back occurs is determined by the lead or the lag of the phases between a radio frequency zero crossing (RFZC) signal and a tracking error zero crossing (TEZC) signal.

3. The method according to claim 2, wherein in the step (b), whether the number of turn-back tracks is greater than the default value is determined from the TEZC and RFZC signals.

4. A track-seeking processor for controlling the turn-back in an optical storage device having a pickup head in response to a first track cross signal and a second track cross signal, the track-seeking processor comprising:

an actual speed detector, for receiving the first and second track cross signals to obtain an actual speed of the pickup head;
    a direction detector, for receiving the first and second track cross signals to obtain an actual track-seeking direction of the pickup head by a phase difference between the first and second track cross signal;
    a track number counter, for receiving the first or second track cross signal to obtain the number of tracks jumped by the pickup head;
    a target speed generator, connected to the track number counter, for receiving the number of tracks generated by the track number counter to obtain a target speed of the pickup head, wherein the target speed is associated with a target track-seeking direction; and
    a speed error generator, connected to the actual speed detector, the direction detector, the track number counter, and the target speed generator, for generating a speed error according to the target speed, the actual speed, and the target track-seeking direction, wherein:
        when the turn-back does not occur, the speed error is set according to the target speed and the actual speed; and
        when the turn-back occurs,
            if the number of turn-back tracks is not greater than a default value which indicates tolerance to the turn-back of the optical storage device, the speed error is set to zero; or
            if the number of turn-back tracks is greater than the default value, the speed error is set according to the target speed and an inversion of the actual speed, and the actual track-seeking direction is inverted;
        wherein the actual track-seeking direction corresponds to the target track-seeking direction when the turn-back is controlled by the speed error.

5. The track-seeking processor according to claim 4, wherein the first track cross signal is a tracking error zero crossing (TEZC) signal.

6. The track-seeking processor according to claim 4, wherein the second track cross signal is a radio frequency zero crossing (RFZC) signal.

7. The track-seeking processor according to claim 4, wherein the speed error generator generates the speed error set according to a difference between the target speed and the inversion of the actual speed if the number of turn-back tracks is greater than the default value.

8. A track-seeking method for reducing turn-back in an optical storage device having a pickup head, according to a first track cross signal and a second track cross signal, the track-seeking method comprising the steps of:

obtaining an actual speed of the pickup head according to the first and second track cross signals;
    obtaining an actual track-seeking direction of the pickup head by a phase difference between the first and second track cross signals;
    obtaining the number of tracks jumped by the pickup head according to the first or second track cross signal;
    obtaining a target speed of the pickup head according to the number of tracks, wherein the target speed is associated with a target track-seeking direction;
    if the turn-back does not occur, generating a speed error which is set according to the target speed and the actual speed;

if the turn-back occurs, generating a speed error which is set according to the target speed and an inversion of the actual speed and inverting the actual track-seeking direction as the target track-seeking direction; and controlling the pickup head according to the speed error, wherein the actual track-seeking direction corresponds to the target track-seeking direction so that the turn-back is reduced.

9. The track-seeking method according to claim 8, wherein the speed error is set according to a difference between the target speed and the inversion of the actual speed if the turn-back occurs.

10. The track-seeking method according to claim 9, wherein the first track cross signal is a tracking error zero crossing (TEZC) signal.

11. The track-seeking method according to claim 10, wherein the second track cross signal is a radio frequency zero crossing (RFZC) signal.

12. The track-seeking method according to claim 8, wherein, if the turn-back occurs, the step of generating a speed error set according to the target speed and an inversion of the actual speed and inverting the actual track-seeking direction as the target track-seeking direction further, comprises the step of:

setting the speed error to zero if the number of turn-back tracks is not greater than a default value which indicates tolerance to the turn-back of the optical storage device;

wherein the speed error is set according to a difference between the target speed and the inversion of the actual speed if the number of turn-back tracks is greater than the default value.

13. The track-seeking method according to claim 12, wherein the first track cross signal is a tracking error zero crossing (TEZC) signal.

14. The track-seeking method according to claim 13, wherein the second track cross signal is a radio frequency zero crossing (RFZC) signal.

\* \* \* \* \*